United States Patent [19]
Inaba

[11] Patent Number: 5,879,064
[45] Date of Patent: Mar. 9, 1999

[54] MASKING-AMOUNT GUIDE DEVICE FOR STEREO SLIDE

[76] Inventor: Minoru Inaba, No. 1116, Oaza Samukawa, Oyama-shi, Tochigi-ken, Japan

[21] Appl. No.: 964,804

[22] Filed: Nov. 5, 1997

[51] Int. Cl.[6] .................................................. G03B 21/00
[52] U.S. Cl. ...................................................... 353/7; 353/9
[58] Field of Search ............................... 353/7, 9, 10, 97;
359/469, 468, 466, 467, 473; 40/701, 704,
5, 706, 361

[56] References Cited

U.S. PATENT DOCUMENTS

| | | | |
|---|---|---|---|
| 5,101,269 | 3/1992 | Shelley et al. | 358/88 |
| 5,522,789 | 6/1996 | Takahashi | 600/166 |
| 5,685,626 | 11/1997 | Inaba | 353/120 |
| 5,720,538 | 2/1998 | Inaba | 353/9 |
| 5,722,751 | 3/1998 | Inaba | 353/7 |
| 5,737,655 | 4/1998 | Inaba | 396/324 |

Primary Examiner—Safet Metjahic
Assistant Examiner—Hung Henry Nguyen
Attorney, Agent, or Firm—Fattibene & Fattibene; Paul A. Fattibene; Arthur T. Fattibene

[57] ABSTRACT

A masking-amount guide device for a stereo slide can verify suitable masking amount by observing a stereo slide film strip with the following constitution. Projection lenses 13R and 13L and focusing plates 14R and 14L are provided in a frame 54, a film guide 16 is disposed at the rear. Lens boards 52R and 52L are respectively engaged with the guide slots 55R and 55R of the frame. The right and left guide slots are obliquely moved symmetrically to the optical axis, the lens boards are obliquely moved by the rotation of a cam shaft 25 so that the inner edges of the focusing plates are always brought into agreements with the inner edges of the projection pictures irrespective of the projection magnification. The cam shaft is rotated while observing the images of the focusing plates so that the images are observed at the back of the same plane or pattern as the collimation pattern of the focusing plate. When the number of a dial mounted at the cam shaft is observed, the number of the stereo slide mount of optimum picture masking factor is observed.

14 Claims, 15 Drawing Sheets

MASKING-AMOUNT GUIDE DEVICE FOR STEREO SLIDE

FIELD OF THE INVENTION

The present invention relates to a masking-amount guide device for verifying the adequate masking amount for a stereo slide. More specifically, the invention relates to a masking-amount guide device for facilitating the selection of the amount for the stereo slide by providing the displaying function of the stereo slide mount of the corresponding masking amount.

BACKGROUND OF THE INVENTION

Non-overlapping portions are formed at the left edge portion of a left picture and the right edge portion of a right picture of stereo slide films photographed by a stereo camera of the structure that an interval between the optical axes of right and left lenses is fixed in response to the distance of a subject according to the difference of the visual fields of right and left photographing lenses.

Since these non-overlapping portions do not contribute to forming a solid image to obstruct the view when the stereo slide films are viewed by using a stereo slide viewer, the windows of the pictures of the stereo slide mount have been generally formed in a width narrower than the one picture of the stereo slide film to mask the outer non-overlapping portions of the right and left pictures.

To obtain natural stereo effect, it is also known to need to correct the position of a subject by masking the outsides of the picture of right and left stereo slide films so that the subject (particularly in the case of large influence of the subjects in a close-range view) for mostly affecting the influence to the matching of right and left images in the pictures are disposed nearly at the equal positions on the right and left pictures. That is, when all subjects like a mountain photograph are located nearly at infinitely remote distance, it is not almost necessary to mask the outsides of the pictures, but the near the distance of a subject is disposed, the more the portions to be masked are increased.

The present applicant has proposed a stereo camera that was so formed that the distance between the optical axes of right and left photographing lenses could be adjusted. According to this stereo camera, the distance between the optical axes of the photographing lenses is automatically or manually adjusted in response to the distance of the subject at the time of taking a photograph to suitably correct a parallax. Therefore, it does not almost need to mask the outsides of right and left pictures of the films photographed by the inter-optical axis distance adjusting type stereo camera by the stereo slide mount, but when the subject which strongly affects the influence to the matching of right and left images is photographed at a closer range than a focal distance, it might need to correct a sense of distance by slightly masking the outsides of the right and left pictures.

As mentioned above, the stereo slide films are mounted by adjusting the masking amounts of the outsides of the pictures by varying the interval between the right and left films in response to the distance of the subject or selecting the stereo slide mount of the width of the picture windows to be considered suitably from a plurality of types of stereo slide mounts having different widths of the picture windows, and hence the mounting operation becomes cumbersome and inefficient.

It is not easy to determine suitable masking amounts, the selection of the stereo slide mount and the adjustment of the interval between the films are easily mistaken, and there arises a problem that it is not easy to mount the stereo slide films in an optimum stereo effect state.

Therefore, in order to facilitate the determination of accurate masking amount and the selection of conforming stereo slide mount, it becomes necessary to solve a technical assignment. The object of the present invention is to solve this technical assignment.

SUMMARY OF THE INVENTION

The present invention was proposed in order to accomplish the above-mentioned object and provides a masking-amount guide device for a stereo slide for stereoscopically viewing stereo photographs of a film strip photographed by a stereo camera, determining an optimum picture masking-amount of the stereo photographs, and indicating the slide mount of a picture masking factor confirming to the determined masking amount, wherein two optical systems constituted by projection lenses, focusing plates having collimation patterns and eyepieces are disposed at the right and left sides, a film guide having a pair of picture windows are disposed in a lateral direction at the rear of said projection lenses along the feeding direction of the film strip, one set of pictures of the film strip exposed in a pair of right and left picture windows of said film guide are individually projected to said right and left focusing plates, wherein a projection magnification adjusting mechanism for moving right and left projection lenses in an optical axis direction, a focusing plate interval adjusting mechanism, and an interlocking mechanism of said projection magnification adjusting mechanism and said focusing plate interval adjusting mechanism are provided, the width of said focusing plates coincides with the widths of projection pictures at the time of minimum projection magnification, and said projection magnification adjusting mechanism and said focusing plate interval adjusting mechanism are formed in relationship that the inner edges of said right and left focusing plates coincide with the inner edges of the projection pictures, and wherein a dial for displaying an operating amount is provided at an operating knob of said interlocking mechanism, identification numbers of a stereo slide mount of various types of window widths correspond to operating amount index of said dial so that said index displays the number of the slide mount of a picture masking factor equal to picture masking factor of the projection picture on the focusing plate.

A masking-amount guide device for a stereo slide, wherein the interval of the focusing plates is fixed, a projection magnification adjusting mechanism for moving right and left projection lenses to increase or decrease projection magnification is provided, and moving locus of the principal points of said right and left projection lenses is a curve or a straight line similar to the curve that the inner edges of said right and left focusing plates coincide with the inner edges of the projection pictures.

A masking-amount guide device for a stereo slide, wherein projection magnification is constant, the widths of said focusing plates are formed narrower than the widths of the projection pictures and right and left focusing plate interval adjusting mechanism is provided, and wherein a dial for displaying an operating amount is provided at an operating knob of said interlocking mechanism, identification numbers of a stereo slide mount of various types of film mounting position offset amounts correspond to operating amount index of said dial so that said index displays the number of the slide mount of a picture offset factor equal to picture offset factor of the projection picture on the focusing plate.

BRIEF DESCRIPTION OF THE DRAWINGS

FIG. 1 illustrates a stereo slide mount system, wherein

DETAILED DESCRIPTION OF THE PREFERRED EMBODIMENTS

Figure 1A:
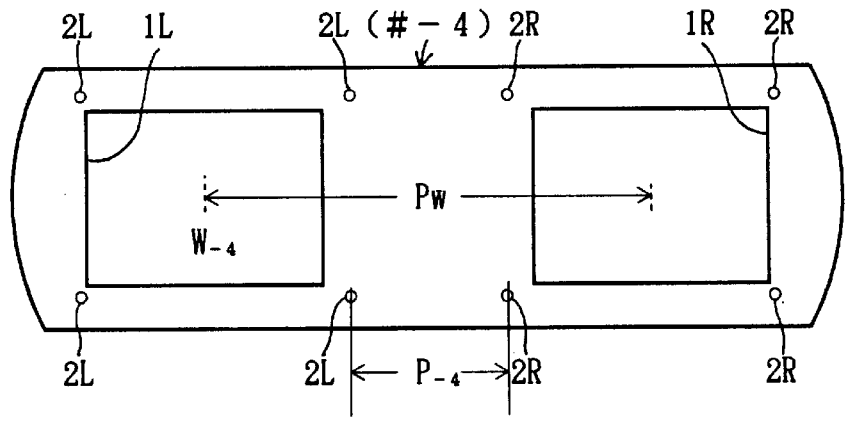
FIGS. 1(a), 1(b) and 1(c) are front views of the stereo slide mounts.
Figure 1B:
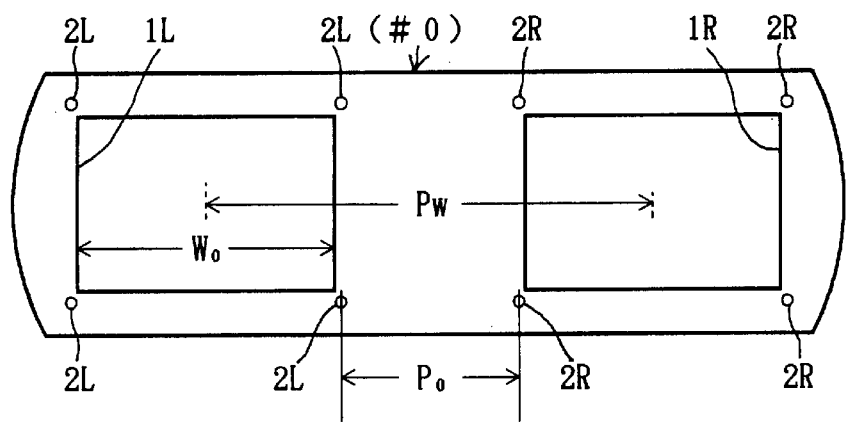
Figure 1C:
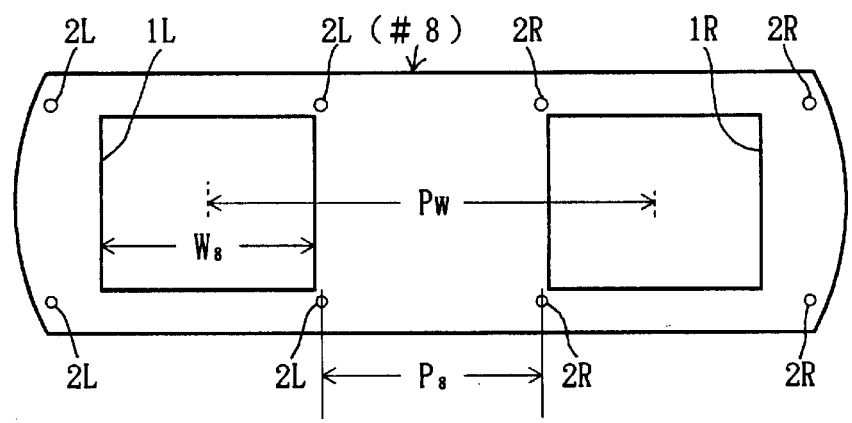

Embodiments of the present invention will now be described in detail with reference to the accompanying drawings. First, a stereo slide mount system concerned with a masking-amount guide device of claims 1, 2 and 3 will be described. FIG. 1 illustrates a stereo slide mount system. As shown in FIG. 1(a), 1(b) and 1(c), the masking-amount guide device is constituted by a plurality of types of stereo slide mounts #–4 to #–8 having different widths W of picture windows 1R and 1L. As one system example corresponding to the stereo camera having a format of one picture in a width of 32.00 mm, the widths W of the picture windows are stepwisely decreased at 0.25 mm unit from #0 of the picture window width $W_0$=32.00 mm (masking amount=0) toward both ± directions to increase the masking amounts (FIG. 1 shows by enlarging the difference of the picture window widths from the actual value).

As shown in FIG. 1, the pitches $P_W$ of the right and left picture windows 1R and 1L of the respective stereo slide mounts (#–1, . . . #0, . . . #8) are the same. To engage the perforations of the films, the intervals ($P_{-4}$, . . . , $P_8$) of the positioning pins 2R and 2L provided near the four corners of the picture windows are stepwisely enlarged in the order of numbers at 0.25 mm unit.

The outer edge portion of the picture of the mounted film is brought in agreement with the outer edge portions of the picture windows 1L and 1R of the stereo slide mount (#–4, . . . , #0) of #0 or less, and the inner edge portion of the picture of the mounted film is brought into agreement with the inner edge portions of the picture windows 1R and 1L of the stereo slide mount (#0, . . . , #8) of #0 or more.

The outside of the picture is normally masked by the stereo slide mount of #0 or more to correct a parallax. However, when a photograph is taken by a stereo camera having a manual inter-optical axis distance adjusting mechanism in the excessively correcting state that the inter-optical axis distance is excessively short by an erroneous operation, if the insides of the right and left pictures are slightly masked to correct the sense of distance, the stereo slide films of the parallax excess correction can be recovered. The stereo slide mount of #–1 or less is used for the film of such excess correction photographing state.

Though the illustration is omitted, the present applicant has also proposed a stereo slide mount system that was so formed that the picture window widths are stepwisely changed, the mounting pitches of the right and left films and the gap between the right and left picture windows are constant as the system having a plurality of type of stereo slide mounts in which the masking mounts of the pictures are stepwisely varied similarly to the stereo slide mount system of FIG. 1.

In case of mounting the films in the above-mentioned stereo slide mount, if the suitable picture masking amounts of one set of stereo photographs on films strips are determined by the following masking amount guide device and then the films cut at each one frame unit are mounted in the stereo slide mount of the determined masking amount, one set of the films are positioned by positioning pins 2R and 2L, and the portions to be masked of the right and left pictures are masked to make it possible to obtain accurate stereo effect.

Figure 2:
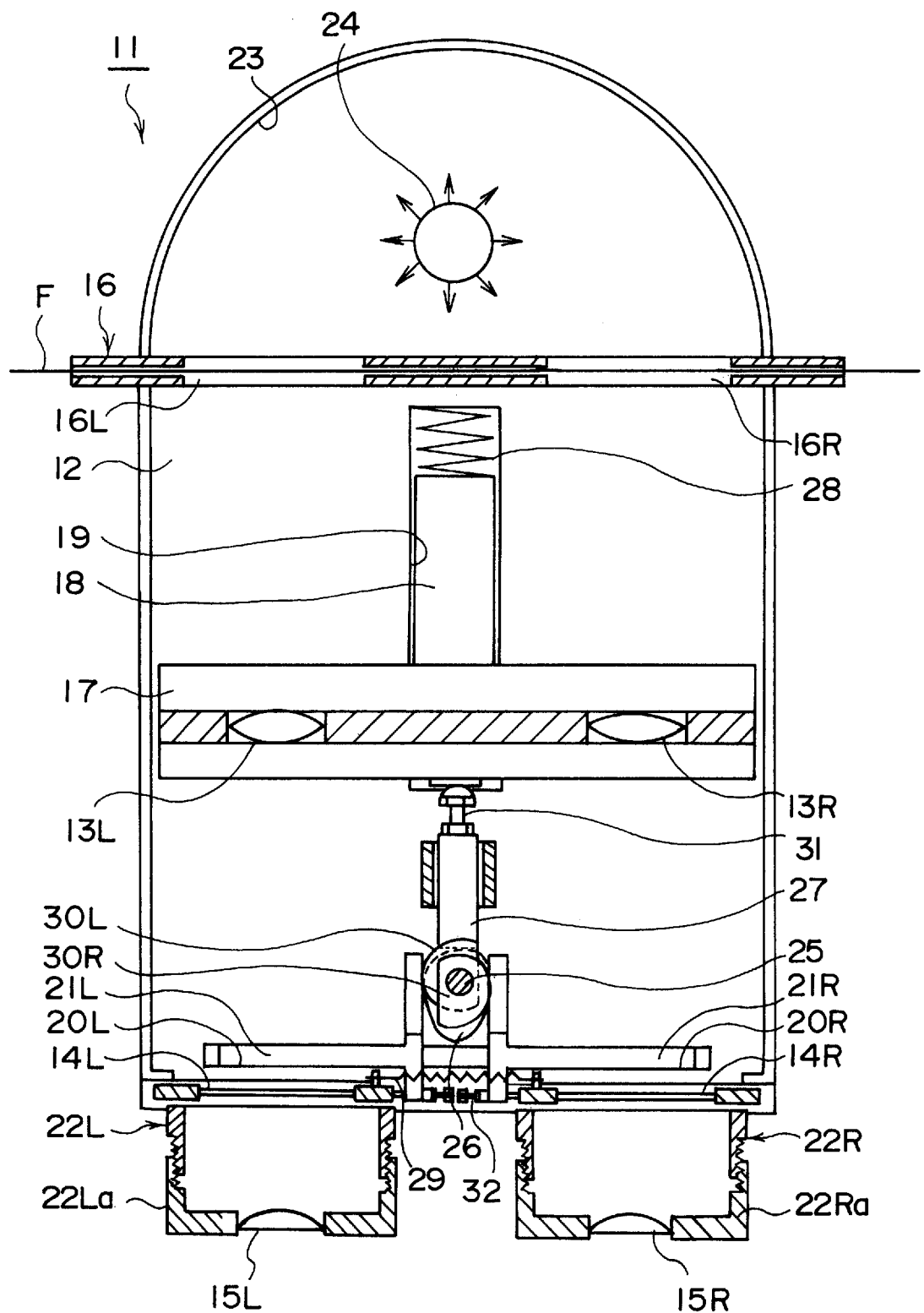
FIG. 2 is a plan sectional view of a masking-amount guide device of claims 1 and 6.

Then, the masking-amount guide device 11 of claims 1 and 6 will be described. As shown in FIG. 2, the masking-amount guide device 11 is constituted by right and left optical systems having projection lenses 13R and 13L, focusing plates 14R and 14L and eyepieces 15R and 15L in a frame 12 in a structure that a film guide 16 is secured to the rear portion (upper portion in FIG. 2) of the frame 12 to observe a film strip F charged in the film guide 16.

A slider 18 is connected to a center on the lower surface of a lens board 17 for mounting the right and left projection lenses 13R and 13L. The slider 18 is movably engaged with a guide slot 19 in the longitudinal direction and molded at the center of the right and left of the inner bottom of the frame 12 so that the lens board 17 is slidable in the longitudinal direction.

Two focusing plate slide guides 20R and 20L of lateral directions are symmetrically provided at the front portion of the frame 12, focusing plate holders 21R and 21L are respectively movably engaged with the right and left focusing plate slide guides 20R and 20L so that the focusing plates 21R and 21L are laterally slidable.

Figure 3L:
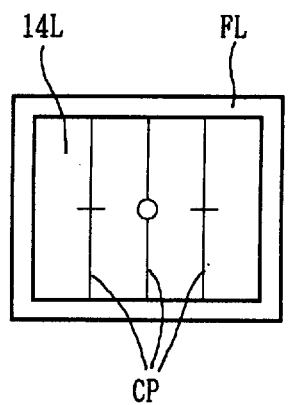
FIGS. 3(L) and 3(R) are front views of a focusing plate.
Figure 3R:
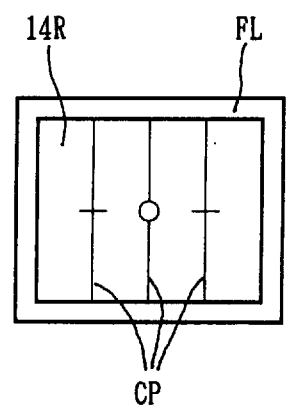

FIG. 3 illustrates the focusing plates 14R and 14L. Each of the focusing plates 14R and 14L is covered on the periphery by a frame FL of light-shielding material or coated with black paint on the periphery of the picture to mask the portion except the picture. The right and left focusing plates 14R and 14L are the same, right and left collimation patterns CP of the same constituted mainly by a plurality of vertical lines are formed by printing or etching, and easy to confirm the matching change due to the movement of the right and left projection pictures in the lateral direction.

In FIG. 2, a known enlarging or contracting interlocking mechanism in which the illustration is omitted, is disposed between the eyepieces 22R and 22L of the frontmost portion opposed to the focusing plates 14R and 14L, can be manually slid symmetrically, and the pitch of the eyepieces can be matched to that of user's two eyes by regulating the pitch of the eyepieces. A diopter can be adjusted by rotating front lens barrels 22R$a$ and 22L$a$ similarly to the general optical equipment.

A semicircular reflecting plate 23 is secured to the rear end of the frame 12, a photograph bulb 24 is installed in the inner space formed by the reflecting plate 23 and the film guide 16 to constitute a dispersing light source, which uniformly illuminates the back surface of the film guide 16.

The right and left picture windows 16R and 16L are provided at the aspect ratio and pitch corresponding to the picture format of the stereo camera in the film guide 16, and the pictures of one set of stereo photographs of the film strip F are exposed in the picture windows 16R and 16L.

In mounting the film strip F in the film guide 16, in the attitude that the left picture of one set of stereo photographs is disposed at the left picture window 16L of the film guide 16 and the right picture is disposed at the right picture window 16R, a photo-sensitive emulsion surface is directed rearward (to the light source side), and inserted into the film guide 16. The picture inverted upside down and left side right in the picture windows 16R and 16L of the film guide 16 as seen from the front side is focused as an erect image on the focusing plates 14R and 14L via the projection lenses 13R and 13L, and the erect image can be stereoscopically watched through the right and left eyepieces 15R and 15L.

A cam shaft 25 for moving the projection lenses 13R and 13L and the focusing plates 14R and 14L is vertically disposed at the intermediate between the right and left focusing plate holders 21R and 21L. A push rod 27 is disposed between the slider 18 of the lens board 17 and the lens moving cam 26 of the cam shaft 25. The slider 18 pushes the push rod 27 by the elastic force of a compression coil spring 28 for energizing the slider 18 toward the cam shaft 25 to urge the push rod 27 onto the lens moving cam 26.

The right and left focusing plate holders 21R and 21L are coupled by a tensile coil spring 29, the right focusing plate holder 21R is urged onto the right focusing plate moving cam 30R of the cam shaft 25, and the left focusing plate holder 21L is urged onto the left focusing plate moving cam 30L. The focusing plate moving cams 30R and 30L are the same shape and mounted in such a manner that the one is deviated at 180° with respect to the other, and the right and left focusing plate holders 21R and 21L are moved symmetrically by rotating the cam shaft 25.

The longitudinal positions of the projection lenses 13R and 13L can be finely regulated by an adjusting screw 31 provided at the push rod 27, and adjusting screws 32 for finely regulating the interval between the focusing plates 14R and 14L are provided at the focusing plate holders 21R and 21L.

Figure 4:
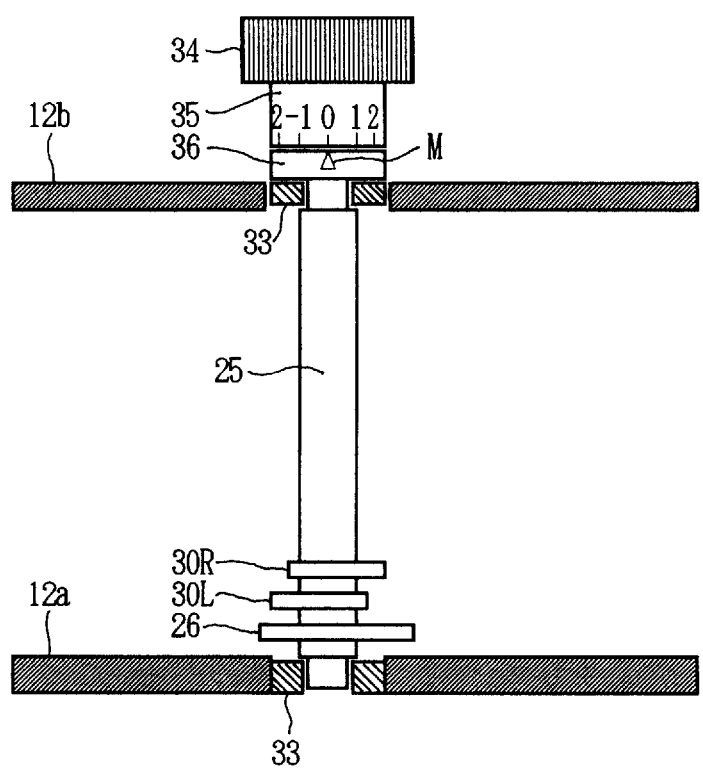
FIG. 4 is a sectional view of an operating portion of a projection magnification adjusting mechanism.

As shown in FIG. 4, the cam shaft 25 is inserted into bearings 33 provided at the bottom plate 12$a$ and the upper cover 12$b$ of the frame 12, and the lens moving cam 26, the right focusing plate moving cam 30R and the left focusing plate moving cam 30L are attached to the lower portion. A knob 34 and a dial 35 are mounted at the upper end of the cam shaft 25, and numbers for indicating the mounting numbers (#–4 to #8) of the stereo slide mount system are engraved on the dial 35. The numbers of the dial 35 which coincide with the index M of a fixed ring 36 are disposed so as to indicate the number of the stereo slide mount of the picture masking actor equal to the masking factor of the projection picture at that time.

The position where the number #0 of the dial 35 coincides with the index M of the fixed ring 36 is the minimum projection magnification position, and when the knob 34 is turned from the position clockwise or counterclockwise, the lens board 17 is moved rearward to increase the projection magnification and right and left focusing plates 14R and 14L approach or separate.

The relationship between the moving amounts of the projection lenses 13R and 13L by the cams 26, 30R and 30L in the optical axis direction and the moving amounts of the right and left focusing plates 14R and 14L in the direction perpendicular to the optical axis becomes the relation that at the time of rotating the knob 34 clockwise (+direction), the focusing plates 14R and 14L move to the inside to the right and left projection pictures and the inner edges of the projection pictures coincide with the inner edges of the right and left focusing plates irrespective of the projection magnification. As the projection magnification increases, the outer edge of the projection picture exceeds out of the focusing plates 14R and 14L, and the projection pictures masked at the outsides of the right and left film pictures are observed.

At the time of rotating the knob 34 counterclockwise (–direction), the focusing plates 14R and 14L move to the outside to the right and left projection pictures, the outer edge of the projection pictures coincide with the outer edges of the right and left focusing plates irrespective of the projection magnification, as the projection magnification increases, the inner edges of the projection pictures exceed the inside from the focusing plates 14R and 14L, and the inside of the right and left film pictures are masked.

At the time of rotating the knob 34 clockwise, as the projection magnification increases, the collimation patterns CP of the focusing plates 14R and 14L move to the inside to the right and left projection pictures, while at the time of rotating the knob 34 counterclockwise, the collimation patterns CP move to the outside to the right and left projection pictures, and the sense of distance of the collimation pattern CP and the stereo image is varied. Accordingly, when the cam shaft 25 is rotated while observing the pictures on the focusing plates by viewing through the eyepieces 15R and 15L in the state that the images are observed in the same plane as the collimation pattern CP or at the back of the collimation pattern CP and the number of the dial 35 indicated by the fixed index M is watched, the number of the stereo slide mount of the optimum picture masking factor for the stereo photograph is discovered.

Figure 5:
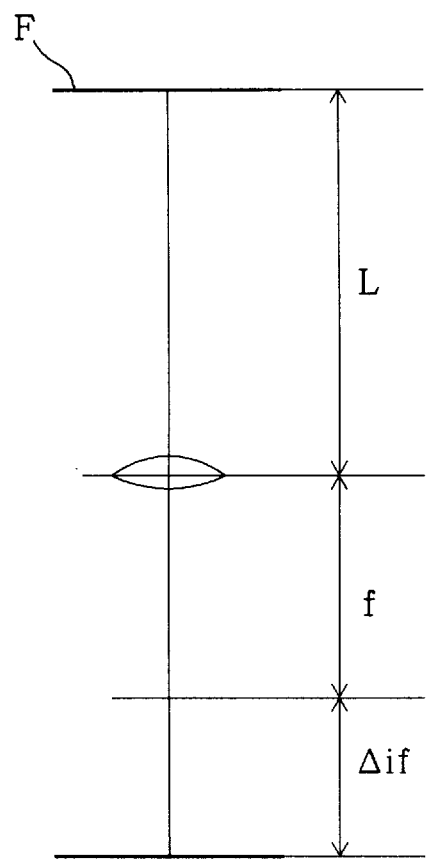
FIG. 5 is a diagram explaining the positional relationship among the film, the projection lens and the focusing plate.

Then, the projection magnification adjusting mechanism and focusing plate interval adjusting mechanism of the masking-amount guide device will be described. FIG. 5 is a diagram for explaining the general relationship of the projection of the lenses, and the following relation is obtained.

$$\Delta if = f^2/(L-f) \tag{1}$$

$$\gamma = \Delta if/f = (\Delta if + f)/L \tag{2}$$

where

Δif: change amount of focused position (varied by projection magnification)

γ: projection magnification f: focal distance of projection lens

L: distance from principal point of projection lens to image surface of film

Therefore, when the stereo slide mount of the suitable masking amount for the stereo slide films of the format of 32.00 mm of picture width is selected from the stereo slide mount system in which the masking amount of the picture is increased or decreased at a 0.25 mm unit shown in FIG. 1, if the width of the focusing plate is set to 32.00 mm equal to the picture width of the film, the step changes of the projection magnification γ and projection picture width becoming the same picture masking factor as the picture masking factor of the stereo slid amount by varying the projection magnification become the values shown in Table 1 from the following formulae:

projection magnification γ=(real picture width(32.00 mm) of film)/(picture window width of mount)

projection picture width=real picture width (32.00 mm) of film×γ where #0 to #8 are explained, but—side (#-1 or less) will be omitted for the description.

The positional relationship among the film, projection lens and focusing plate at the respective projection magnifications γ becomes as follows from the formulae (1) and (2) when the focal distance of the projection ones is f=50 mm.

$$\Delta if = f = \gamma \quad (3)$$

$$L = (\Delta if + f)/\gamma \quad (4)$$

and the calculated values by the formulae (3) and (4) become as Table 2.

where the values of ((Δif+f) and L) are naturally varied as the projection magnification γ changes, and it is understood that the change amount of the distance Δif+f+L from the image surface of the film to the focusing plate is very short.

(Δif+f+L) is minimum at the projection magnification of "1", and its change rate becomes minimum at about "1" of the projection magnification. Therefore, if the adjusting range is set so that the projection magnification at the intermediate point of the projection magnification adjusting range becomes "1", it is estimated that the projection magnification can be adjusted while maintaining the focused state even by a mechanism for moving only the projection lens disposed between the film and the focusing plate by fixing the distance (Δif+f+L) from the photosensitive emulsion surface of the film to the focusing plate.

The projection magnification γ of #4 of the intermediate of the masking amount adjusting range of the exemplified stereo slide mount system (#0 to #8) is γ=1.03226 as shown in Table 2, if the width of the focusing plate is 32 mm equal to the picture width of the film, where if 1/1.03226 is multiplied by the projection magnificationγ and the projection magnification is reduced, the projection magnification at #0 becomes 0.9688, and the projection magnification of #4 becomes "1". When the width of the focusing plate is similarly reduced to 1/1.03226, it becomes the same projection picture masking factor of the case of Table 1 at guide numbers (#0 to #8). Therefore, Width of focusing plate=picture width of film×projection magnification=32×0.9688=31.002 (mm)

The actual projection magnification of the stereo slide mount (#0 to #8) is as below γa=γ/1.03226=0.9688×γ

γa is substituted for γ of formulae (3) and (4), and the values of (Δif+f) and L and (Δif+f+L) are calculated to Table 3.

Δif+f+L (distance from the image surface of the film to focusing plate) of Table 3. is 200 mm at the minimum and 200.054 mm at the maximum, and its average is:

(200+200.054)/2=200.027 (mm)

Accordingly, when (Δif+f+L) is fixed to 200.027 mm and (Δif+f), L of guide numbers #0 to #8 are recalculated by actual projection magnification γ. Table 4 is obtained from the following formulae (5) and (6):

$$L = (\Delta if + f + L)/(1 + \gamma a) \quad (5)$$

$$\Delta if + f = L \times \gamma a \quad (6)$$

When the theoretical values of Table 3 are compared with the actual value of Table 4, both the values of Δif+f and L become a difference of 0.014 mm at the maximum, which are mechanical tolerance or less or the error or less of the position before and after the film in the optical axis direction of the lens, and even if the distance from the film to the focusing plate is fixed, it is understood that sufficient optical accuracy is obtained as the masking-amount guide device.

The foregoing description relates to the explanation of the moving amount of the projection lens for varying the projection magnification for the stereo slide mount of the respective guide numbers, and the moving amount of the focusing plate in the direction perpendicular to the optical axis interlocked to the movement of the projection lens becomes as follows:

The moving amount of the focusing plate for always bringing the inner edge of the focusing plate into agreement with the inner edge of the projection picture becomes (projection picture width—width of focusing plate)/2.

Table 5 indicates the moving amount of the focusing plate of one side for the respective guide number (#0 to #8), and if the right and left focusing plates are moved in the approaching direction by the moving amount of Table 5, the inner edge of the focusing plate is brought into agreement with the inner edge of the projection picture irrespective of the projection magnification.

The focusing plate is fixed and the projection lens is moved in the direction perpendicular to the optical axis simultaneously upon movement of the projection lens in the optical axis direction different from the above-mentioned masking-amount guide device to constitute the masking-amount guide device for the same operation as above. The moving amount of the projection lens in this case becomes as follows:

When indicating

Shifting amount of projection lens : Sl

Shifting amount of projection image: Si

Figure 6:
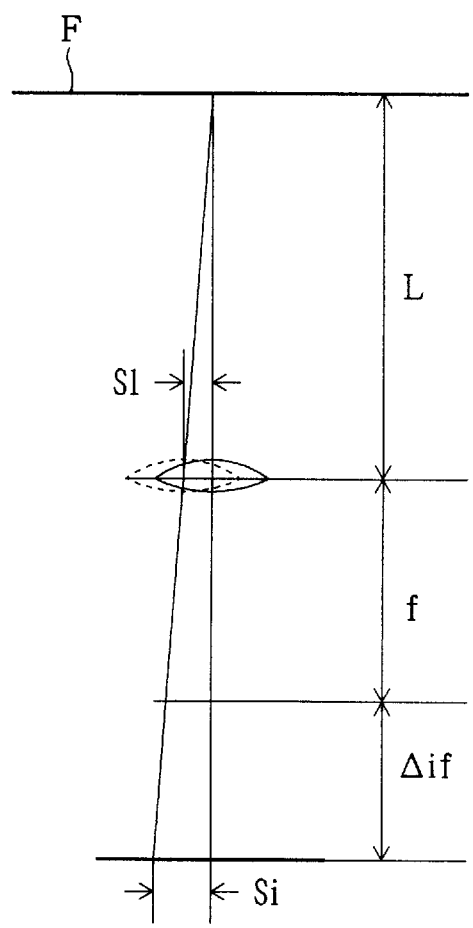
FIG. 6 is a diagram for explaining the shifting mount of the projection lens.

From FIG. 6, the following formulae are obtained $$Sl/Si = L/(\Delta if + f + L) \quad (7)$$

$$Sl = Si/(1 + \gamma a) \quad (8)$$

The shifting amount Sl of the case that the focusing plate is fixed and the projection lens is shifted become as Table 6 from the formulae (7) and (8).

The relationship between the shifting amount of te projection lens in the direction perpendicular to the optical axis and the moving amount of the projection lens in the optical axis direction becomes as Table 7 when the moving amount of the projection lens in the optical axis direction is Xl and the shifting amount of the direction perpendicular to the optical axis is Sl.

When the value of the moving amount Xl of the projection lens at the guide number #0 of Table 4 for the distance L from the principal point of the lens to the image surface of the film in the optical axis direction is zero, the value of the Xl for the respective guide numbers is the difference obtained by subtracting the value of the L for the guide number from the value of the L for the guide number #0 of Table 4.

$\tan^{-1}$ Sl/Xl of Table 7 is the gradient of movement of the projection lens to the optical axis, and 0l is the moving amount in the oblique direction at that time. As the projection magnification is increased, the lens moving mechanism is so designed as to increase the inter-optical axis distance of the projection lenses along the curve to make it possible to continuously vary the projection magnification in the state that the frame of the inside of the focusing plate is always brought into agreement with the inner edge of the projection picture.

Figure 7:
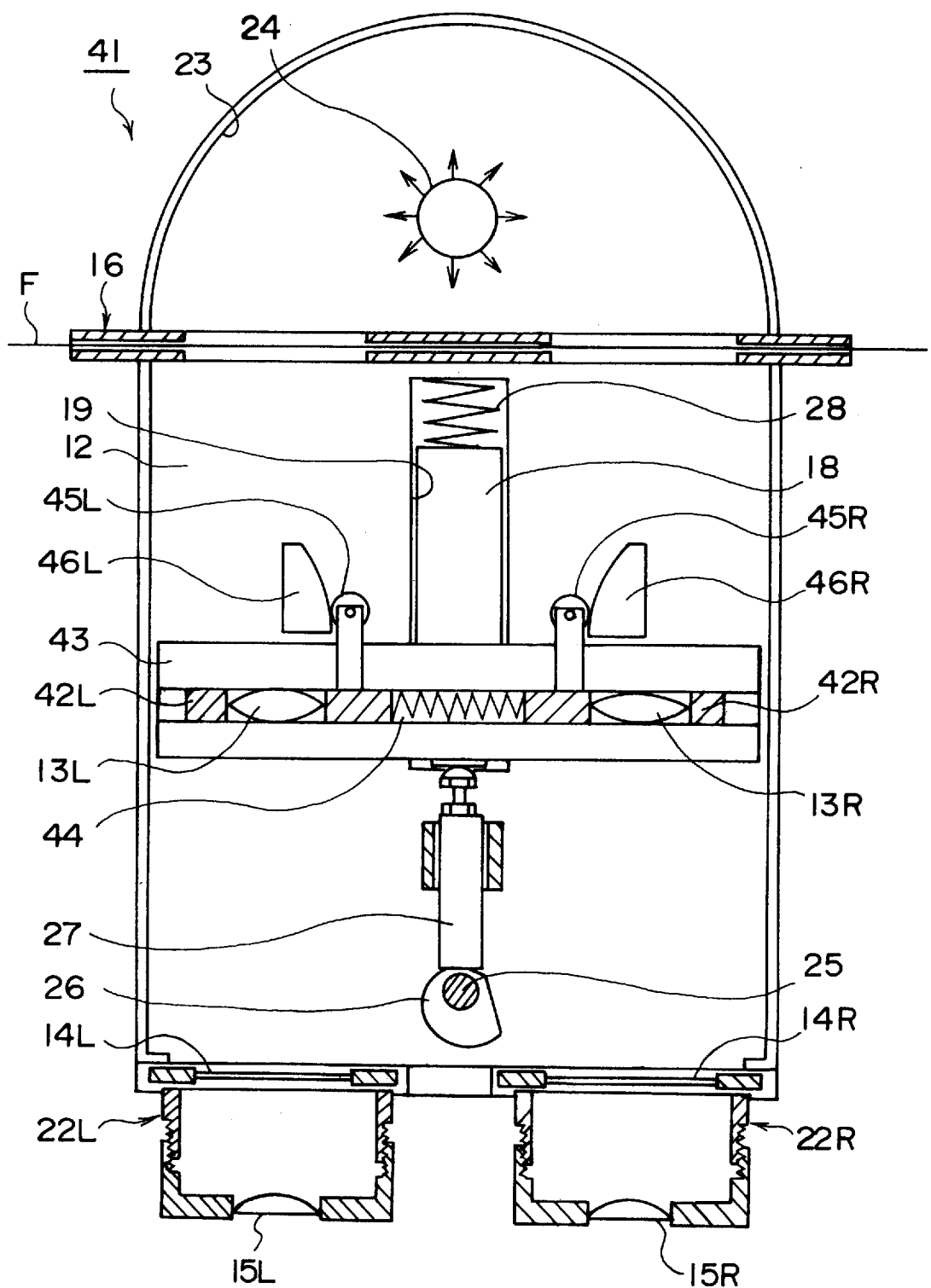
FIG. 7 is a plan sectional view of the masking-amount guide device of claims 3 and 7.

FIG. 7 shows a masking-amount guide device 41 of claim 2 of the above-mentoined constitution, the same reference numerals shown in the masking-amount guide device 11 of FIG. 2 will be employed as those for denoting the same or similar elements of the masking-amount guide device 41, and the description thereof will be omitted. A film guide 16 and focusing plates 14R and 14L shown in FIG. 7 are fixed to a frame 12, and the distance (Δif+f+L) between the photosensitive emulsion surface of a film F and the focused surface of the focusing plate becomes 200.027 mm from Table 4.

Right and left projection lens holders 42R and 42L a laterally slidably mounted on a slide guide (not shown) formed on a lens board 43. A compression coil spring 44 is disposed between the right and left projection lens holders 42R and 42L to be urged in the extending direction, and guide rollers 45R and 45L of the right and left projection lens holders 42R and 42L are respectively urged onto the cam surfaces of cam plates 45R and 46L symmetrically fixed to the frame 12.

The shapes of the cam plates 46R and 46L are formed based on the values of Table 7. When the cam shaft 25 is rotated, the lens board 43 is longitudinally moved in the optical axis direction along the guide slot 19, and the right and left projection lens holders 42R and 42L slide in the direction perpendicular to the optical axis by interlocking to the movement of the lens board 43. The inner edges of the focusing plates 14R and 14L are always brought into agreement with the inner edge of the projection picture irrespective of the change of the projection magnification similarly to the masking-amount guide device 1 of FIG. 3.

The constitution of an operating portion is that focusing plate moving cams 30R and 30L are removed from the cam shaft 25 of FIG. 4 described above, a display of dial numbers #–1 or less is eliminated to be rotatable only in the clockwise direction (+direction) from the minimum projection magnification position (#0), and the operation for indicating the number of the dial for the mounting number (#0 to #8) of the stereo slide mount system confirming to the projection picture on the focusing plate is the same.

Then, a masking-amount guide device of claim 3 will be described. In the case of Table 7, it is understood that the oblique slide curve of the projection lens is near a straight line having a gradient of about 8° 57' to the optical axis. Therefore, when the projection lens position in the case of obliquely moving the projection lens along the straight line of the gradient of 8° 57' is recalculated, $Sl=0l \times \sin 8° 57'$ $Xl=0l \times \cos 8° 57'$ are obtained and become the values indicated in Table 8.

When the shifting amounts Sl of the direction perpendicular to the optical axis of Tables 7 and 8 are compared with the moving amount Xl in the optical axis direction, it is understood that there is only a difference of 0.001 mm at the maximum at Sl and even if the projection lens is straightly obliquely moved, it can be sufficiently used into practice. The projection lens is straightly obliquely moved to simplify the moving mechanism, and hence mechanical error is reduced. Accordingly, accurate masking-amount guide device can be provided.

Figure 8:
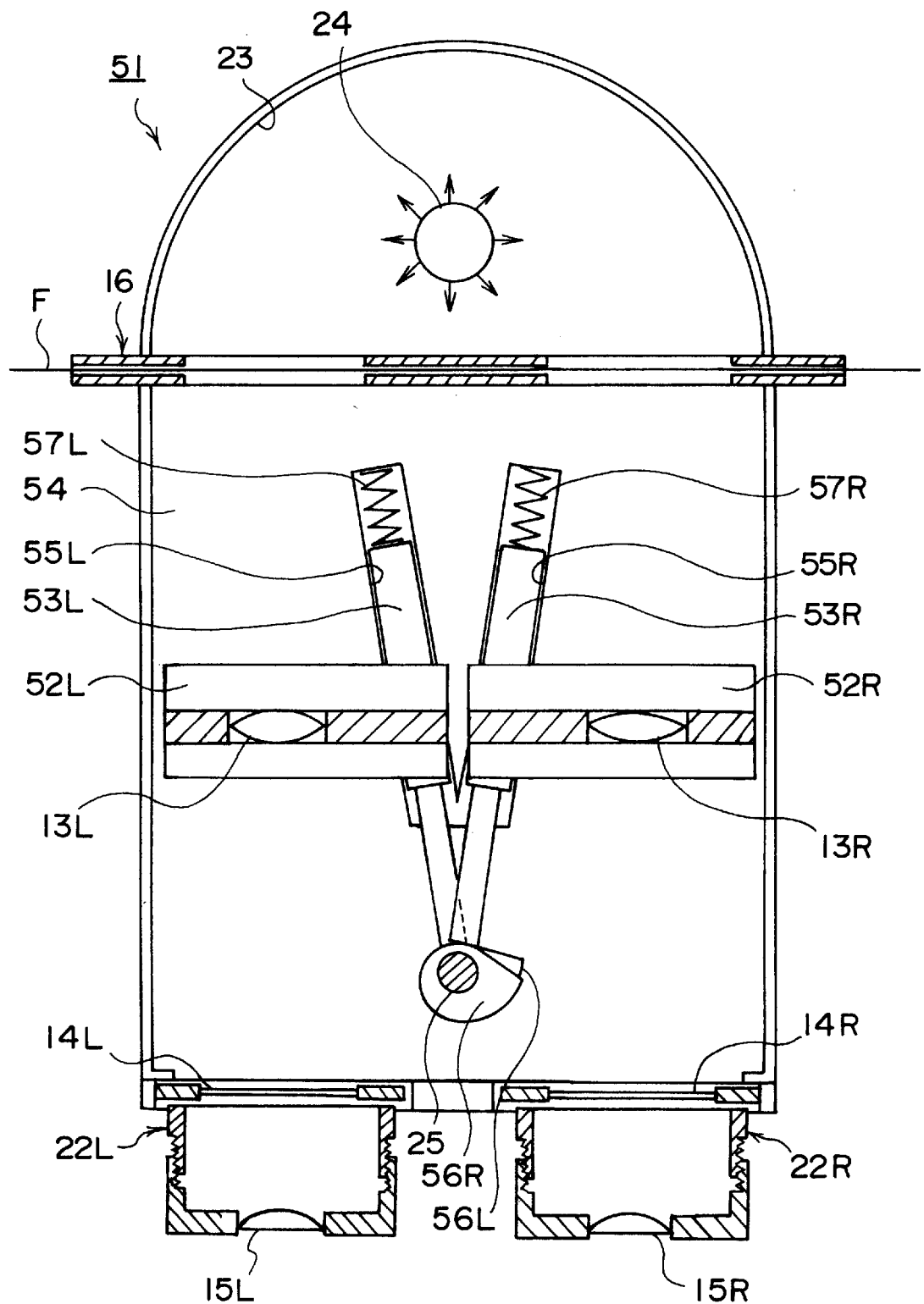
FIG. 8 is a plan sectional view of the masking-amount guide device of claims 3 and 7.

FIG. 8 is a structural view of a masking-amount guide device 51 of claims 3 and 7 for straightly obliquely moving projection lens. The positions of a film guide 16 and focusing plates 14R and 14L are fixed similarly to the above-mentioned masking-amount guide device 41 of FIG. 7, and the distance Δif+f+L=200.027 mm between the photosensitive emulsion surface of the film and the focused surface of the focusing plate is obtained.

Lens boards 52R and 52L are laterally divided, and sliders 53R and 53L mounted on the lower surfaces are individually engaged with two guide slots 55R and 55L formed in a frame 54. In this case, in the case of pitch of pictures=pitch of focusing plates, the right guide slot 55R is inclined at +8° 57' to the optical axis of projection lenses 13R and 13L as described above, and the left guide slot 55L is inclined at –8° 57', and when the pair of lens boards 52R and 52L are retracted toward the film guide 16, an interval of the lens boards 55R and 55L is increased.

A cam shaft 25 is vertically installed at the position where the extension line of the centerline of the right and left guide slots 55R and 55L is crossed at the front (lower in FIG. 8) of the lens boards 52R and 52L, and two cams 56R and 56L are attached to the cam shaft 25.

The two cams 56R and 56L are the same shape, and mounted by changing the phase equally to the angle=8° 57'×2=17° 54' formed between the two guide slots 55R and 55L. The right and left sliders 53R and 53L are energized forward by the elastic forces of compression coil springs 57R and 57L to individually urge onto the cams 56R and 56L. As the cam shaft 25 is rotated, the right and left lens boards 52R and 52L longitudinally move synchronously so that the frame of the inside of the focusing plates 14R and 14L are always brought into agreement with the inner edge of the projection picture irrespective of the projection magnification.

A knob and a dial are mounted on the upper end of the cam shaft 25, and numbers corresponding to the mounting numbers (#0 to #8) of a stereo slide mount system are engraved on the dial similarly to the above-mentioned masking-amount guide device 41 of FIG. 7, the operating principle and operating method are the same, and hence the description will be omitted.

Figure 9:
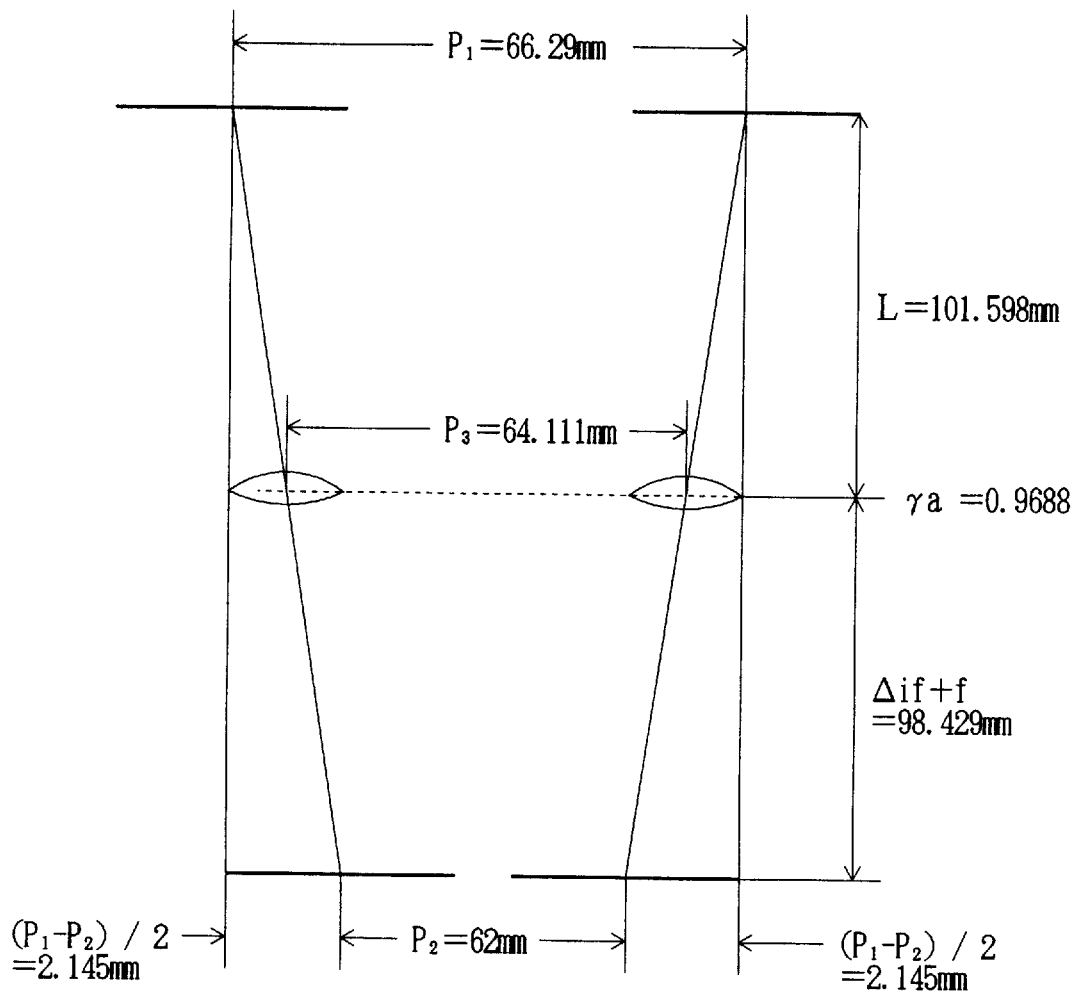
FIG. 9 is a diagram for explaining the positional relationship amount the film, the projection lens and the focusing plate when the pitch of the pictures of the films is different from that of the focusing plates.

The above-mentioned embodiment is the case that the pitch of the right and left focusing plates is equal to that of the pictures of the stereo slide films, but there are various picture pitches of stereo cameras. The pitches of right and left eyepieces and focusing plates are set indispensably to about 63 mm of the interval between human standard eyes. As one example of a stereo camera using a 135 mm film of a masking-amount guide device in which the pitch of right and left photographing pictures is adapted for 14 perforations=66.29 mm will be described. When the pitch of the right and left focusing plates is 62 mm, the inter-optical axis distance of the right and left projection lenses when the guide number is #0 is as in FIG. 9. A picture pitch $P_1$=66.29 (mm), and a focusing plate pitch $P_2$=62.00 (mm). Therefore, the inter-optical axis distance $P_3$ of the projection lenses is:

$$\begin{aligned} P_3 &= P_1 - (P_1 - P_2)/(1 + \gamma a) \\ &= 66.29 - (66.29 - 62)/(1 + 0.9688) \\ &= 64.111 \text{(mm)} \end{aligned}$$

The pitch of the right and left projection lenses at the reference position of the guide number #0 is 64.111 mm, and the shifting amount $Sl_2$ in the direction perpendicular to the optical axis of the lenses at the guide number (#0 to #8) is as follows from FIG. 10

$$\begin{aligned} Sl_2 &= ((P_1 - P_3)/2) - (((P_1 - P_2)/2) - Si(1 + \gamma a) \\ &= ((66.29 - 64.111)/2) - (((66.29 - 62)/2 - Si)/(1 + \gamma a) \\ &= 1.0895 - (2.145 - Si)/(1 + \gamma a) \end{aligned}$$

The calculated values of the respective guide numbers (#0 to #8) are as Table 9.

The relationship between $Sl_2$ of Table 9 and Xl of Table 7 becomes as Table 10.

From Table 10, it is understood that the projection lens may be straightly obliquely moved at the gradient of about 9° 33' to the optical axis in this case. When the positions $Sl_2$ and Xl of the projection lenses when the lenses are straightly obliquely moved at the gradient of 9° 33' are recalculated, $$Sl_2 = 0l_2 \times \sin 9° 33' \quad (9)$$

$$Xl = 0l_2 \times \cos 9° 33' \quad (10)$$

are obtained. From the above formulae, $Sl_2$ and Xl become the values in Table 11. And the inter-optical axis distance of right and left projection lenses for the respective guide numbers (#0 to #8) becomes $P_3n$ of Table 11 from $P_3n = P_3 + 2Sl_2$.

The $Sl_2$ and Xl of Table 11 are compared with the theoretical values of Table 10, and there is only a difference of 0.001 (mm), which is a mechanical tolerance or less, and accurate operation can be expected.

The present applicant has proposed a stereo camera that the inter-optical axis distance of right and left photographing lenses was adjustable. According to this stereo camera, the inter-optical axis distance of the photographing lenses is automatically or manually adjusted in response to the distance of a subject at the time of photographing to correct suitable sense of distance at the time of photographing. Accordingly, there is almost no case that the outsides of the right and left pictures are masked by a stereo slide mount, but in the case that the subject for affecting the strong influence to the matching of right and left images is photographed at a closer-range distance than the focused distance, it might need to slightly correct the sense of distance by slightly masking the outsides of the right and left pictures. However, since the necessary masking amount is extremely smaller than the stereo slide by the inter-optical axis distance fixed type stereo camera, there is considered a method for masking the parts of the right and left pictures by adjusting the offset amount of the film in the lateral direction by using a stereo slide mount having slightly smaller picture window width than the width of the picture of the film.

Figure 11A:
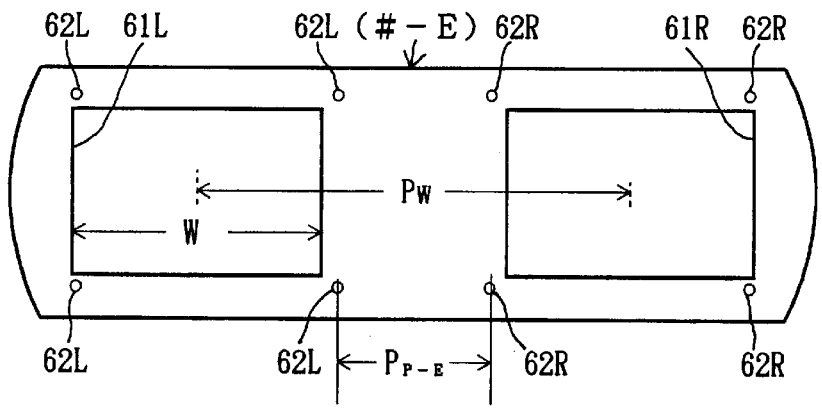
FIG. 11 illustrates a stereo slide mount system, wherein FIG. 11(a), 11(b) and 11(c) area front views of the stereo slide mount.
Figure 11B:
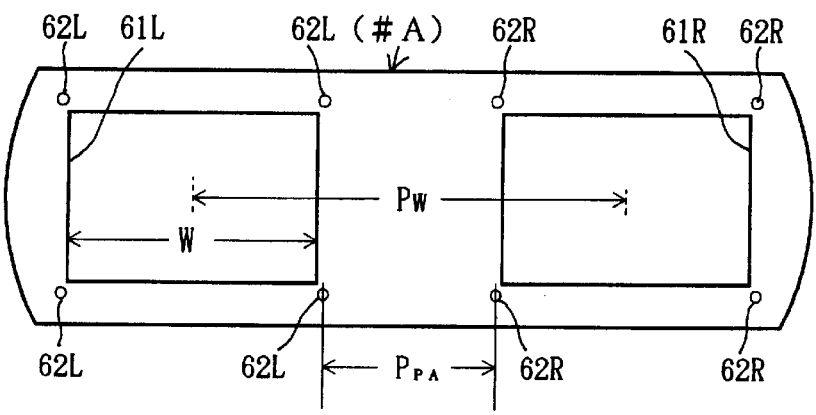
Figure 11C:
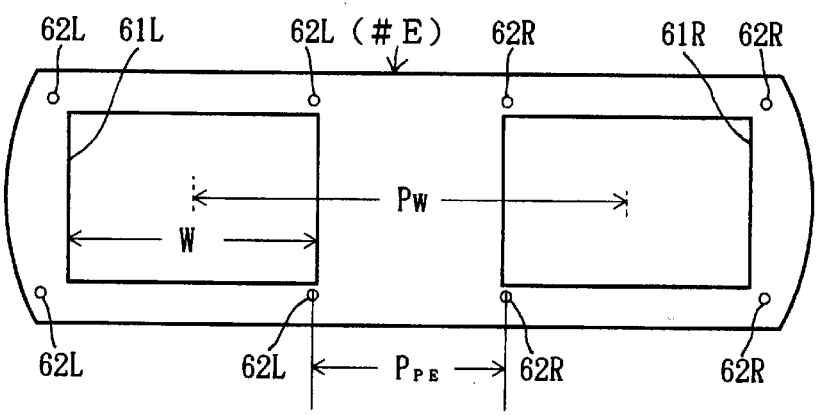

FIG. 11 shows a stereo slide mount system corresponding to the above-mentioned mounting method, in which the widths (W) of the picture windows 61R and 61L of the stereo slide mount (#−E, . . . #A, . . . #E) is constant, is slightly narrower than the width of the pictures of the films, for example, picture window width W=31 mm is set to the picture width=32 mm of the film.

The pitches $P_W$ of the picture windows 61R and 61L are all the same, but the pitch $P_P$ of the film positioning pins 62R and 62L provided near the four corners of the picture windows 61R and 61L are stepwisely increased at 0.25 mm unit from #−E (FIG. 11 shows enlarged displaced amount). THe films are offset 1 mm to the picture windows 61R and 61L at #−E, the enter of the pictures of the films at #A is brought into agreement with the center of the picture windows 61R and 61L of the mount, the amounts of offset of the film to the outside with respect to the picture windows are increased in the order of #B, . . . , #E, and the outside of the picture of the film at #E is masked 1 mm.

The stereo slide mount of minus side is used for the film photographed by a parallax excess correction due to erroneous operation in a stereo camera having a manual inter-optical axis distance adjusting mechanism similarly to the stereo slide mount system of FIG. 1, and the outside of A picture is normally masked by the stereo slide mount of #A or more to correct a parallax.

Figure 12:
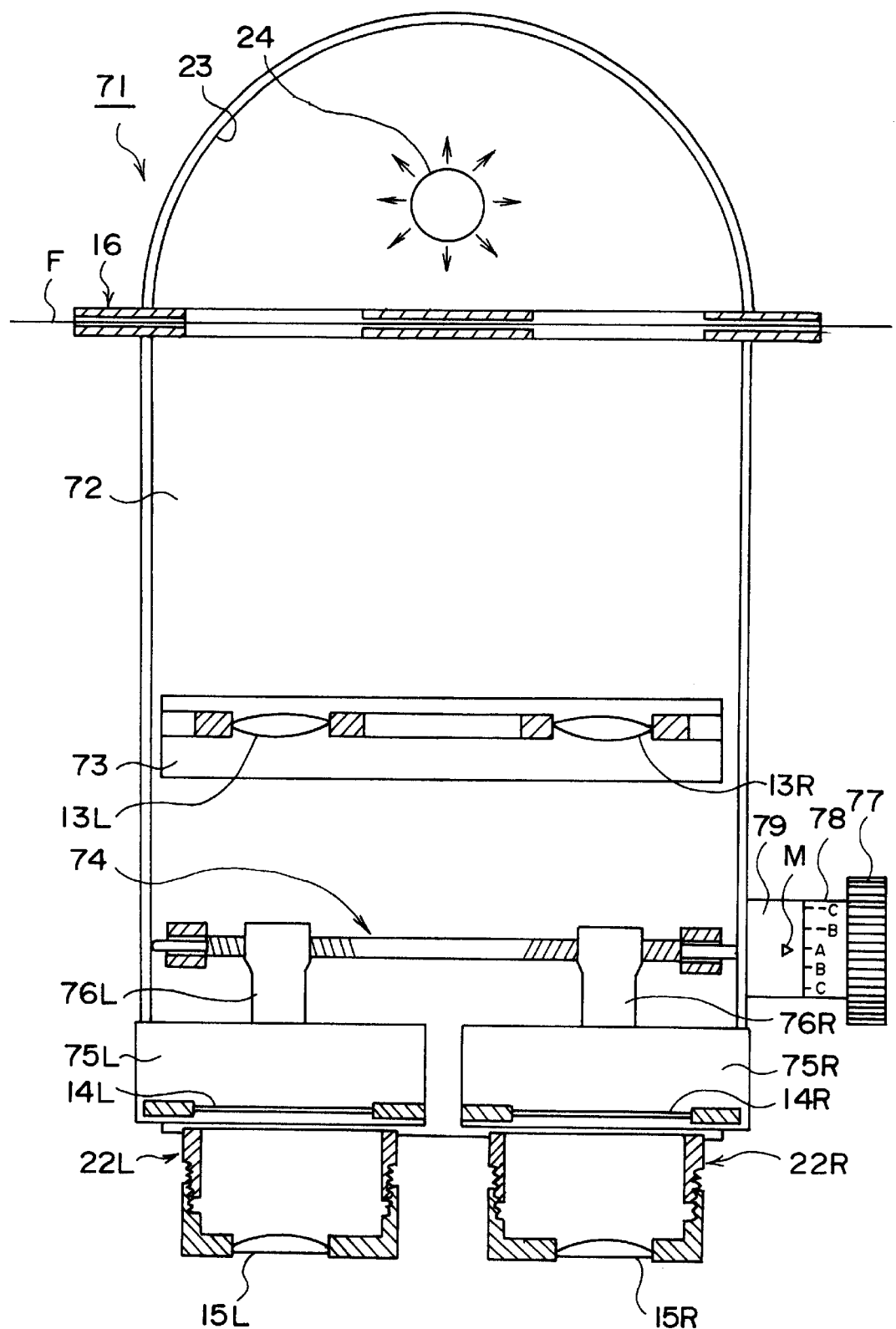
FIG. 12 is a plan sectional view of the masking-amount guide device of claims 3 and 7.

FIG. 12 shows a projection magnification fixed type masking-amount guide device 71 of claims 4 and 10 corresponding to the above-mentioned stereo slide mount system (#−E, . . . , #A, . . . , #E). A film guide 16 and a lens board 73 are fixed to a frame 72. A feed screw 74 is installed at the front portion of the frame 72 in a lateral direction, female threads (not shown) are molded on arms 76R and 76L provided at right and left focusing plate holders 75R and 75L, and the feed screw 74 is engaged with the female threads by a ball screw mechanism.

Right-hand threads and left-hand threads are cut symmetrically from the intermediate portion at the feed screw 74. When the knob 77 at the end of the feed screw 74 is turned clockwise, the right and left focusing plate holders 75R and 75L approach in the direction perpendicular to the optical axis, while when the knob 77 is turned counterclockwise, the right and left focusing plate holders 75R and 75L separate in the direction perpendicular to the optical axis to make it possible to adjust the interval between the focusing plates 14R and 14L. The widths of the focal plates 14R and 14L are obtained by (31 mm of picture window width of the stereo slide mount (#−E to #E))× Projection magnification γ. The projection magnification γ=1 is set to the width of the focusing plates=31×1=31 mm.

Characters corresponding to the mounting numbers (#−E to #E) of the stereo slide mount system are engraved on a dial 78 provided coaxially with the knob 77 at the end of the feed screw 74. When the #A of a correcting amount zero coincides with the index M of a fixed ring 79, the centers of the focusing plates 14R and 14L are disposed on the straight line passing the center of the picture of the film F and the principal point of projection lenses 13R and 13L.

When the dial 78 is turned in +direction with #A, #B, . . . , #E, the right and left focusing plates 14R and 14L approach, the exceeding amount of the outer area of the projection picture out of the focusing plate is increased to increase the outer masking amount of the projection picture. When the dial 78 is turned in −direction from #A to #−B, . . . #−E, the right and left focusing plates 14R and 14L approach, the inner area of the projection picture exceeds to the inside of the focusing plate to increase the inner masking amount of the projection picture.

When the number of the dial 78 when the positional relationship between the collimation patterns of the focusing plates 14R and 14L and the solid image becomes the best state is watched, the number of the optimum stereo slide mount is observed.

Figure 13:
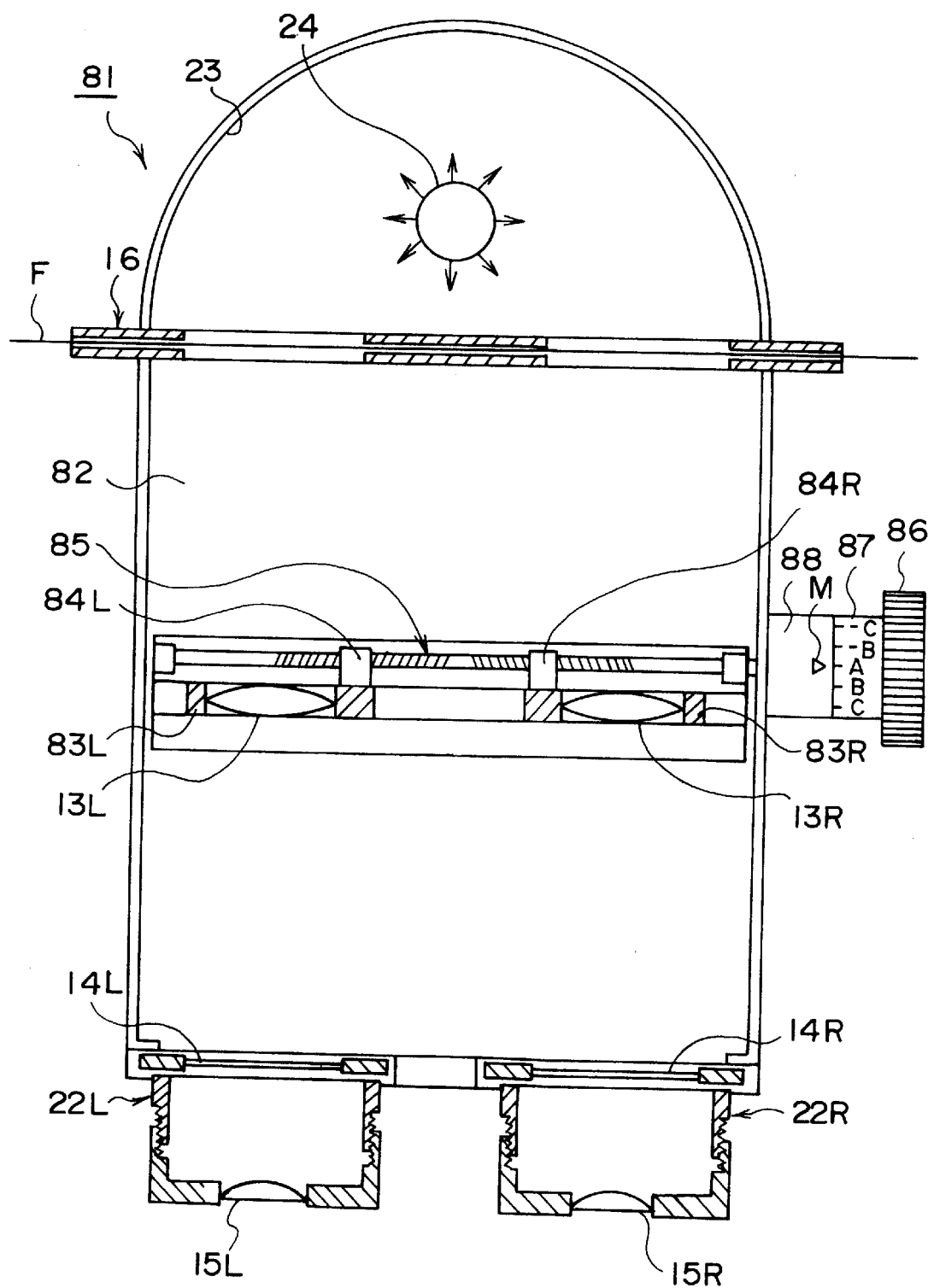
FIG. 13 is a plan sectional view of the masking-amount guide device of claims 5 and 11.

FIG. 13 shows a masking-amount guide device 81 of claims 5 and 11. Inter-optical axis distance adjusting mechanisms of projection lenses 13R and 13L are provided instead of the focusing plate moving mechanisms so as to operate the same as that of the masking-amount guide device 71 of FIG. 12. As shown in FIG. 13, a film guide 16 and focusing plates 14R and 14L are fixed to a frame 82, female threads (not shown) are molded on arms 84R and 84L provided at separate right and left projection lens holders 83R and 83L, and a feed screw 85 of lateral direction installed in the frame 82 is coupled to the female threads of right and left projection lens holders 83R and 84L by a ball screw mechanism.

Right-hand threads and left-hand screws are cut symmetrically from the intermediate portion at the feed screw 85. When the knob 86 at the end of the feed screw 85 is turned clockwise, the right and left projection lens holders 83R and 83L separate in the direction perpendicular to the optical axis, while when the knob 86 is turned counterclockwise, the right and left projection lens holders 83R and 83L approach in the direction perpendicular to the optical axis.

The widths of the focusing plates 14R and 14L and the projection magnification γ are the same as those of the masking-amount guide device 71 of FIG. 12. The width of the focusing plate =31 mm, and the projection magnification γ=1. The characters corresponding to the mounting numbers (#–E to #E) of a stereo slide mount system are engraved on a dial 87 coaxial with the knob 86 similarly to that of the masking-amount guide device 7e of FIG. 12. WHen the #A of correcting amount zero coincides with the index M of the fixed ring 88, the principal points of the projection lenses 13R and 13L are disposed on a straight line for coupling the center of the picture of the film F to the centers of the focusing plates 14R and 14L.

As the dial 87 is turned to #A, #B, . . . #E, the interval between the right and left projection lenses 13R and 13L is increased, and the outer area of the projection picture exceeds out of the focusing plates 14R and 14L. Contrary to it, when the dial 87 is turned to #A, #–B, . . . #–E, the interval between the projection lenses 13R and 13L is decreased, the inner area of the projection picture exceeds to the insides of the focusing plates 14R and 14L so that the state of the parallax correction can be observed similarly to the masking-amount guide device 71 of FIG. 12. Since the projection magnification γ=1, the moving amounts of the projection lenses 13R and 13L at a guide number unit are ½ of the moving amount of the focusing plates of the masking-amount guide device 71 of FIG. 12.

Figure 14:
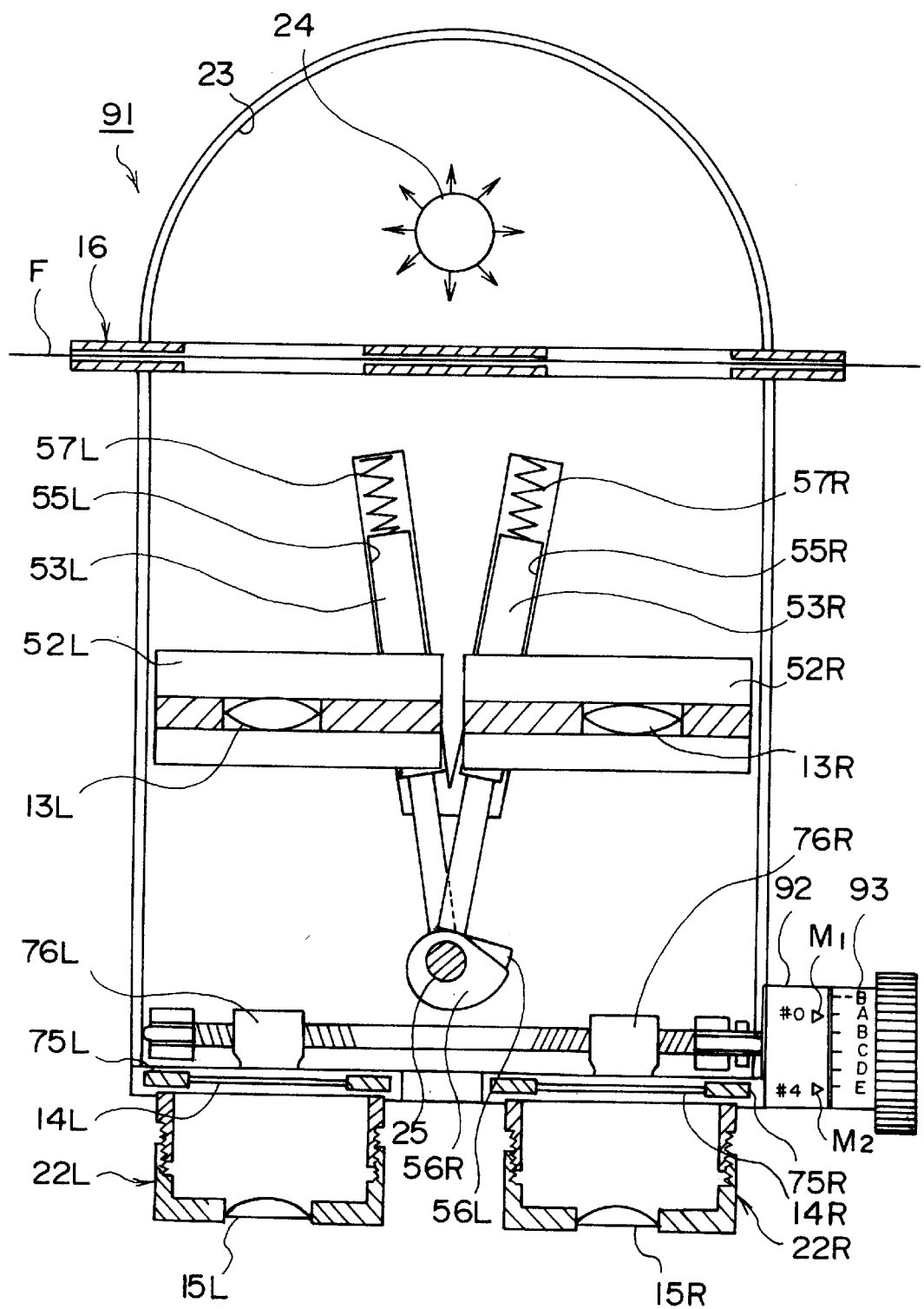
FIG. 14 is a plan sectional view of the masking-amount guide device of claims 7 and 9.

FIG. 14 shows a masking-amount guide device 81 of claim 9. The focusing plate interval adjusting mechanism of the masking-amount guide device 71 of FIG. 12 is added to the projection magnification adjusting mechanism of the masking-amount guide device 51 of FIG. 10 to deal with both the stereo slide mount system of FIG. 1 and the stereo slide mount system of FIG. 11.

Since the mechanical constitutions of the projection magnification adjusting mechanism and the focusing plate interval adjusting mechanism have been already described, the description will be omitted. Incidentally, two fixed indexes $M_1$, $M_2$ of #0 and #4 corresponding to the #0 and #4 of the dial of the projection magnification adjusting mechanism are marked on a fixed ring 92 of the focusing plate interval adjusting mechanism.

When #A of the dial 93 of the focusing plate interval adjusting mechanism shown in FIG. 14 is matched to the fixed index $M_1$ (#0), the focusing plates 14R and 14L are adjusted to the reference position of offset zero similarly to #0 column in Table 5, while when #A of the dial is matched to the fixed index $M_2$ (#4), the right and left focusing plates 14R and 14L are adjusted to 0.5 mm offset in the interval increasing direction in the same amount as the moving amount of the focusing plate of #4 column in Table 5.

Figure 10:
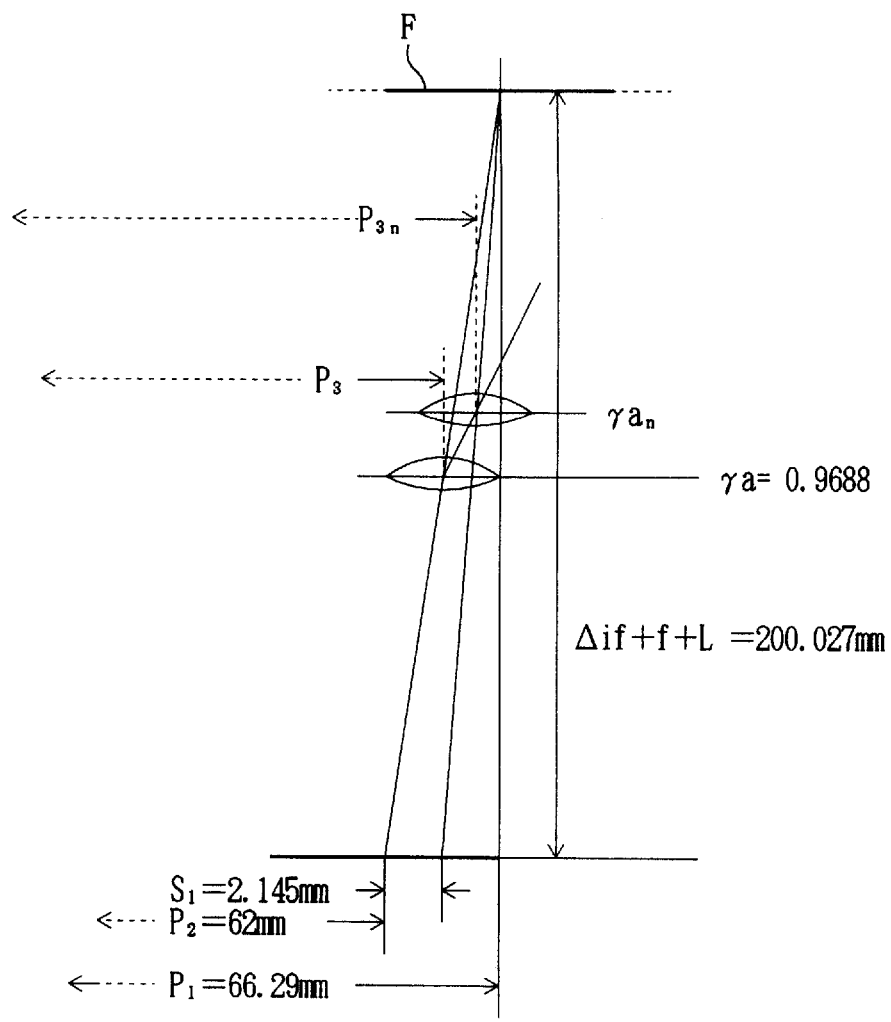
FIG. 10 is a diagram for explaining the moving amount of the projection lens in the case of FIG. 9.

Therefore, the projection magnification adjusting mechanism is operated to determine the masking amount entirely similarly to the masking-amount guide device 51 of FIG. 10 in the state that the #A of the dial 93 of the focusing plate interval adjusting mechanism is matched to #0 of the index $M_1$ of the fixed ring 92.

On the other hand, when it is used as the masking-amount guide device of the stereo slide mount system of FIG. 11, the projection magnification is fixed, the interval between the focusing plates 14R and 14L is adjusted, and the matching of the right and left images to the collimation pattern is observed. In this case, the projection magnification of #4 of Table 5 is γ a=1.0001 to be nearly "1", and the projection picture width is 32.003 mm, which may be regarded as being 32 mm. The outer offset amount =0.501 mm of the projection pictures of the focusing plates 14R and 14L is nearly 0.5 mm.

Therefore, when the #4 of the dial (not shown) mounted at the cam shaft 25 is matched to the fixed index M similarly to the projection magnification operating portion shown in FIG. 4, projection magnification γ=1 and projection picture width=32 mm are obtained, and the center of the projection picture is 0.5 mm offset at the outside from the centers of the focusing plates 14R and 14L of the width =31 mm.

When the #A of the dial 93 of the focusing plate interval adjusting mechanism shown in FIG. 14 is matched to the index $M_2$ (#4) of the fixed ring 92, the right and left focusing plates 14R and 14L are 0.5 mm offset in the interval increasing direction, the projection magnification γ=1 and the center of the projection picture coincides with the center of the focusing plates to become the same state as the masking-amount guide device 71 of FIG. 12.

When the dial 93 is turned in positive or negative direction in this state to adjust the positional relationship between the collimation pattern of the focusing plates and the stereo image to the best state and the character of the dial 93 coincident with the index $M_2$ (#4) is observed, the optimum number (#–E to #E) of the stereo slide mount is observed similarly to the masking-amount guide device 7 of FIG. 12.

Figure 15A:
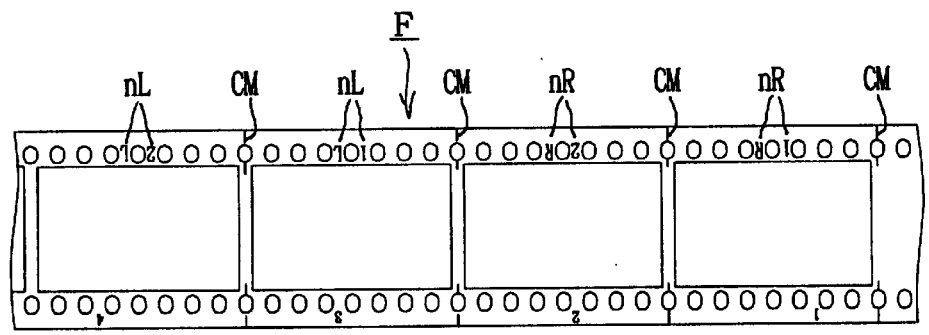
FIG. 15(a) is a front view of a stereo slide film strip photographed by a stereo camera with a cutting mark exposure function.
Figure 15B:
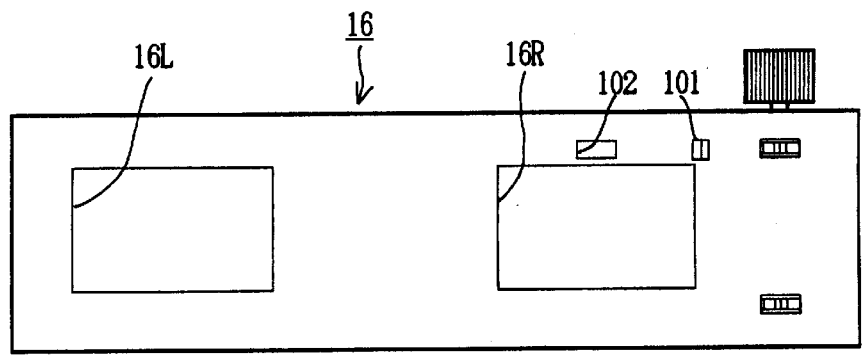
FIG. 15(b) is a front view of the film guide.

The present applicant has further proposed a stereo camera that a cutting mark CM as the target of cutting at the gap between the pictures of the films F is exposed as shown in FIG. 15(a) and frame numbers nR and nL are exposed at the outsides of the pictures. However, when a cutting mark display window 101 and a frame number display window 102 are provided at the film guide 16 as shown in FIG. 15(b), the pictures of the films F can be accurately aligned with the picture windows 16R and 16L of the film guide 16 and the frame number can be visually viewed.

Figure 15C:
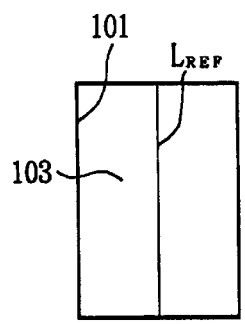
FIG. 15(c) is an enlarged view of a cutting mark display window of the film guide.

FIG. 15(c) is an enlarged view of the cutting mark display window 101. A transparent window glass 103 is mounted in the cutting mark display window 101. In the transparent window glass 103, the index line $L_{REF}$ similar to the cutting mark CM of the film shown in FIG. 15(a) is printed on the window glass 103, and when the cutting mark CM of the film is brought into agreement with the index line $L_{REF}$ the picture windows 16R and 16L coincide with the positions of the pictures of the films F.

Though illustration is omitted, the focusing plate holders are formed replaceably in the above-mentioned masking-amount guide device, and when the focusing plates 14R and 14L having the collimation patterns are replaced with the focusing plates of the entire mat surface having no collimation pattern so as to be used as a stereo slide viewer having high performance.

According to the masking-amount guide device of the present invention as described above, the longitudinal positional relationship between the projection images and the collimation pattern is observed while relatively changing the pitch of the projection magnification or focusing plates and the pitch of the projection pictures and the number of the dial when becoming the best state is watched. Then, the number of the stereo slide mount of the optimum parallax correcting amount is observed. Therefore, the inaccurate parallax correction in the conventional mounting method is eliminated, the stereo slide of the state of the best visual effect can be simply formed, and the efficiency of the mounting operation can be remarkably improved.

Moreover, constitution of each of the portions can be modified in a variety of ways within technical scope of the present invention, and the present invention covers such modified embodiments, as a matter of source.

TABLE 1

| Guide No. | Width of Mount Window | Projective Magnification γ | Projective Picture Width |
|---|---|---|---|
| #0 | 32.00 | 1.00 | 32.000 |
| #1 | 31.75 | 1.00787 | 32.252 |
| #2 | 31.50 | 1.01587 | 32.508 |
| #3 | 31.25 | 1.02400 | 32.768 |
| #4 | 31.00 | 1.03226 | 33.032 |
| #5 | 30.75 | 1.04065 | 33.301 |
| #6 | 30.50 | 1.04918 | 33.574 |
| #7 | 30.25 | 1.05785 | 33.851 |
| #8 | 30.00 | 1.06667 | 34.133 |

TABLE 2

| Guide No. | γ | $\Delta if + f$ | L | $\Delta if + f + L$ |
|---|---|---|---|---|
| #0 | 1.00 | 100.0000 | 100.0000 | 200.0000 |
| #1 | 1.00787 | 100.3935 | 99.6096 | 200.0031 |
| #2 | 1.01587 | 100.7935 | 99.2189 | 200.0124 |
| #3 | 1.02400 | 101.2000 | 98.8281 | 200.0281 |
| #4 | 1.03226 | 101.6130 | 98.4374 | 200.0504 |
| #5 | 1.04065 | 102.0325 | 98.0469 | 200.0794 |
| #6 | 1.04918 | 102.4590 | 97.6563 | 200.1153 |
| #7 | 1.05785 | 102.8925 | 97.2657 | 200.1582 |
| #8 | 1.06667 | 103.3335 | 96.8749 | 200.2084 |

TABLE 3

| Guide No. | γ | γa | $\Delta if + f$ | L | $\Delta if + f + L$ |
|---|---|---|---|---|---|
| #0 | 1.00 | 0.9688 | 98.440 | 101.610 | 200.050 |
| #1 | 1.00787 | 0.9764 | 98.820 | 101.209 | 200.029 |
| #2 | 1.01587 | 0.9842 | 99.210 | 100.803 | 200.013 |
| #3 | 1.02400 | 0.9921 | 99.605 | 100.398 | 200.003 |
| #4 | 1.03226 | 1.0001 | 100.005 | 99.995 | 200.000 |
| #5 | 1.04065 | 1.0082 | 100.410 | 99.593 | 200.003 |
| #6 | 1.04918 | 1.0164 | 100.820 | 99.193 | 200.013 |
| #7 | 1.05785 | 1.0248 | 101.240 | 98.790 | 200.030 |
| #8 | 1.06667 | 1.0334 | 101.670 | 98.384 | 200.054 |

TABLE 4

| Guide No. | γa | $\Delta if + f$ | L | $\Delta if + f + L$ |
|---|---|---|---|---|
| #0 | 0.9688 | 98.429 | 101.598 | 200.027 |
| #1 | 0.9764 | 98.819 | 101.208 | 200.027 |
| #2 | 0.9842 | 99.217 | 100.810 | 200.027 |
| #3 | 0.9921 | 99.617 | 100.410 | 200.027 |
| #4 | 1.0001 | 100.019 | 100.008 | 200.027 |
| #5 | 1.0082 | 100.422 | 99.605 | 200.027 |
| #6 | 1.0164 | 100.827 | 99.200 | 200.027 |
| #7 | 1.0248 | 101.238 | 98.789 | 200.027 |
| #8 | 1.0334 | 101.656 | 98.371 | 200.027 |

TABLE 5

| Guide No. | γa | Projective Picture Width | Moving Amount of Focusing Plate |
|---|---|---|---|
| #0 | 0.9688 | 31.002 | 0 |
| #1 | 0.9764 | 31.245 | 0.122 |
| #2 | 0.9842 | 31.494 | 0.246 |
| #3 | 0.9921 | 31.747 | 0.373 |
| #4 | 1.0001 | 32.003 | 0.501 |
| #5 | 1.0082 | 32.262 | 0.630 |
| #6 | 1.0164 | 32.525 | 0.762 |
| #7 | 1.0248 | 32.794 | 0.896 |
| #8 | 1.0334 | 33.069 | 1.034 |

TABLE 6

| Guide No. | γa | Si | Sl |
|---|---|---|---|
| #0 | 0.9688 | 0 | 0 |
| #1 | 0.9764 | 0.122 | 0.062 |
| #2 | 0.9842 | 0.246 | 0.124 |
| #3 | 0.9921 | 0.373 | 0.187 |
| #4 | 1.0001 | 0.501 | 0.250 |
| #5 | 1.0082 | 0.630 | 0.314 |
| #6 | 1.0164 | 0.762 | 0.378 |
| #7 | 1.0248 | 0.896 | 0.443 |
| #8 | 1.0334 | 1.034 | 0.509 |

TABLE 7

| Guide No. | Sl | Xl | Sl/Xl | $\tan^{-1}$ Sl/Xl | $Ol = \sqrt{Sl^2 + Xl^2}$ |
|---|---|---|---|---|---|
| #0 | 0 | — | — | — | — |
| #1 | 0.062 | 0.390 | 0.158974 | 9° 02' | 0.395 |
| #2 | 0.124 | 0.788 | 0.157360 | 8° 57' | 0.798 |
| #3 | 0.187 | 1.188 | 0.157407 | 8° 57' | 1.203 |
| #4 | 0.250 | 1.590 | 0.157233 | 8° 56' | 1.610 |
| #5 | 0.314 | 1.993 | 0.157551 | 8° 57' | 2.018 |
| #6 | 0.378 | 2.398 | 0.157631 | 8° 57' | 2.428 |
| #7 | 0.443 | 2.809 | 0.157707 | 8° 58' | 2.844 |
| #8 | 0.509 | 3.227 | 0.157732 | 8° 58' | 3.267 |

TABLE 8

| Guide No. | Sl | Xl |
|---|---|---|
| #0 | 0 | 0 |
| #1 | 0.061 | 0.390 |
| #2 | 0.124 | 0.788 |
| #3 | 0.187 | 1.188 |
| #4 | 0.250 | 1.590 |
| #5 | 0.314 | 1.993 |
| #6 | 0.378 | 2.398 |
| #7 | 0.442 | 2.809 |
| #8 | 0.508 | 3.227 |

TABLE 9

| Guide No. | γa | Si | Sl$_2$ |
|---|---|---|---|
| #0 | 0.9688 | 0 | 0 |
| #1 | 0.9764 | 0.122 | 0.066 |
| #2 | 0.9842 | 0.246 | 0.132 |
| #3 | 0.9921 | 0.373 | 0.200 |
| #4 | 1.0001 | 0.501 | 0.268 |
| #5 | 1.0082 | 0.630 | 0.335 |
| #6 | 1.0164 | 0.762 | 0.404 |
| #7 | 1.0248 | 0.896 | 0.473 |
| #8 | 1.0334 | 1.034 | 0.543 |

TABLE 10

| Guide No. | γa | Sl$_2$ | Xl | Sl$_2$/Xl | tan$^{-1}$ Sl$_2$/Xl | Ol$_2$ = $\sqrt{Sl_2^2 + Xl^2}$ |
|---|---|---|---|---|---|---|
| #0 | 0.9688 | 0 | 0 | — | — | — |
| #1 | 0.9764 | 0.066 | 0.390 | 0.169231 | 9° 36' | 0.396 |
| #2 | 0.9842 | 0.132 | 0.788 | 0.167513 | 9° 31' | 0.799 |
| #3 | 0.9921 | 0.200 | 1.188 | 0.168350 | 9° 33' | 1.205 |
| #4 | 1.0001 | 0.268 | 1.590 | 0.168553 | 9° 34' | 1.612 |
| #5 | 1.0082 | 0.335 | 1.993 | 0.168088 | 9° 32' | 2.021 |
| #6 | 1.0164 | 0.404 | 2.398 | 0.168474 | 9° 34' | 2.432 |
| #7 | 1.0248 | 0.473 | 2.809 | 0.168387 | 9° 33' | 2.849 |
| #8 | 1.0334 | 0.543 | 3.227 | 0.168268 | 9° 33' | 3.272 |

TABLE 11

| Guide No. | Ol$_2$ | Sl$_2$ | Xl | P$_{3_n}$ |
|---|---|---|---|---|
| #0 | — | — | — | 64.111 |
| #1 | 0.396 | 0.066 | 0.391 | 64.243 |
| #2 | 0.799 | 0.133 | 0.788 | 64.377 |
| #3 | 1.205 | 0.200 | 1.188 | 64.511 |
| #4 | 1.612 | 0.267 | 1.590 | 64.645 |
| #5 | 2.021 | 0.335 | 1.993 | 64.781 |
| #6 | 2.432 | 0.403 | 2.398 | 64.917 |
| #7 | 2.849 | 0.473 | 2.810 | 65.057 |
| #8 | 3.272 | 0.543 | 3.227 | 65.197 |

What is claimed is:

1. A masking-amount guide device for a stereo slide for stereoscopically viewing stereo photographs of a film strip photographed by a stereo camera, determining an optimum picture masking-amount of the stereo photographs, and indicating a picture masking factor of the slide mount confirming to the determined masking amount, wherein two optical systems constituted by projection lenses, focusing plates having collimation patterns and eyepieces are disposed at right and left sides, a film guide having a pair of picture windows are disposed in a lateral direction at the rear of said projection lenses along a feeding direction of the film strip, one set of pictures of the film strip exposed in a pair of right and left picture windows of said film guide are individually projected to focusing plates disposed at right and left sides, wherein a projection magnification adjusting mechanism for moving right and left projection lenses in an optical axis direction, a focusing plate interval adjusting mechanism, and an interlocking mechanism of said projection magnification adjusting mechanism and said focusing plate interval adjusting mechanism are provided, the width of said focusing plates coincides with widths of projection pictures at a time of minimum projection magnification, and said projection magnification adjusting mechanism and said focusing plate interval adjusting mechanism are formed in a relationship that the inner edges of said right and left focusing plates coincide with inner edges of the projection pictures, and wherein a dial for displaying an operating amount is provided at an operating knob of said interlocking mechanism, identification numbers of a stereo slide mount of various types of window widths correspond to an operating amount index of said dial so that said index displays the number of the slide mount of a picture masking factor equal to picture masking factor of the projection picture on the focusing plate.

2. A masking-amount guide device for a stereo slide for stereoscopically viewing stereo photographs of a film strip photographed by a stereo camera, determining an optimum picture masking-amount of the stereo photographs, and indicating a picture masking factor of the slide mount confirming to the determined masking amount, wherein two optical systems constituted by projection lenses, focusing plates having collimation patterns and eyepieces are disposed at right and left sides, a film guide having a pair of picture windows are disposed in a lateral direction at the rear of said projection lenses along a feeding direction of the film strip, one set of pictures of the film strip exposed in a pair of right and left picture windows of said film guide are individually projected to focusing plates disposed at right and left sides, wherein a projection magnification adjusting mechanism for moving right and left projection lenses to increase or decrease projection magnification is provided, the width of said focusing plates coincides with widths of projection pictures at a time of minimum projection magnification, and moving locus of principal points of said right and left projection lenses is a curve that the inner edges of said right and left focusing plates coincide with the inner edges of the projection pictures, and wherein a dial for displaying an operating amount is provided at an operating knob of said interlocking mechanism, identification numbers of a stereo slide mount of various types of window widths correspond to an operating amount index of said dial so that said index displays the number of the slide mount of a picture masking factor equal to picture masking factor of the projection picture on the focusing plate.

3. A masking-amount guide device for a stereo slide for stereoscopically viewing stereo photographs of a film strip photographed by a stereo camera, determining an optimum picture masking-amount of the stereo photographs, and indicating a picture masking factor of the slide mount confirming to the determined masking amount, wherein two optical systems constituted by projection lenses, focusing plates having collimation patterns and eyepieces are disposed at right and left sides, a film guide having a pair of picture windows are disposed in a lateral direction at the rear of said projection lenses along the feeding direction of the film strip, one set of pictures of the film strip exposed in a pair of right and left picture windows of said film guide are individually projected to focusing plates disposed at right and left sides, wherein a projection magnification adjusting mechanism for moving right and left projection lenses to increase or decrease projection magnification is provided, width of said focusing plates coincides with the widths of projection pictures at of minimum projection magnification, and moving locus of principal points of said right and left projection lenses is a straight line similar to a curve that the inner edges of said right and left focusing plates coincide with the inner edges of the projection pictures, and wherein a dial for displaying an operating amount is provided at an operating knob of said interlocking mechanism, identification numbers of a stereo slide mount of various types of window widths correspond to an operating amount index of said dial so that said index displays the number of the slide mount of a picture masking factor equal to picture masking factor of the projection picture on the focusing plate.

4. A masking-amount guide device for a stereo slide for stereoscopically viewing stereo photographs of a film strip photographed by a stereo camera, determining an optimum film mounting position offset amount for the stereo slide mount of the stereo photographs, and indicating a picture masking factor of the slide mount confirming to the determined masking amount, wherein two optical systems constituted by projection lenses, focusing plates having collimation patterns and eyepieces are disposed at right and left sides, a film guide having a pair of picture windows are disposed in a lateral direction at the rear of said projection lenses along the feeding direction of a film strip, one set of pictures of the film strip exposed in a pair of right and left picture windows of said film guide are individually projected to focusing plates disposed at right and left sides, wherein widths of said focusing plates are formed narrower than widths of the projection pictures and right and left focusing plate interval adjusting mechanism is provided, and wherein a dial for displaying an operating amount is provided at an operating knob of said interlocking mechanism, identification numbers of a stereo slide mount of various types of film mounting position offset amounts correspond to an operating amount index of said dial so that said index displays the number of the slide mount of a picture offset factor equal to picture offset factor of the projection picture on the focusing plate.

5. A masking-amount guide device for a stereo slide for stereoscopically viewing stereo photographs of a film strip photographed by a stereo camera, determining an optimum film mounting position offset amount for the stereo slide mount of the stereo photographs, and indicating a picture masking factor of the slide mount confirming to the determined masking amount, wherein two optical systems constituted by projection lenses, focusing plates having collimation patterns and eyepieces are disposed at right and left sides, a film guide having a pair of picture windows are disposed in a lateral direction at the rear of said projection lenses along the feeding direction of film strip, one set of pictures of the film strip exposed in a pair of right and left picture windows of said film guide are individually projected to focusing plates disposed at right and left sides, wherein widths of said focusing plates are formed narrower than widths of the projection pictures and right and left projection lens interval adjusting mechanism is provided, and wherein a dial for displaying an operating amount is provided at an operating knob of said interlocking mechanism, identification numbers of a stereo slide mount of various types of film mounting position offset amounts correspond to an operating amount index of said dial so that said index displays the number of the slide mount of a picture offset factor equal to picture offset factor of the projection picture on the focusing plate.

6. A masking-amount guide device for a stereo slide according to claim 1, wherein said projection magnification adjusting mechanism and said focusing plate interval adjusting mechanism are constituted by a cam mechanism, the cam of said projection magnification adjusting mechanism is a shape for enlarging the projection magnification in both rotating directions from the minimum projection magnification position, and the cam of said focusing plate interval adjusting mechanism reduces the interval of the focusing plates in one rotating direction from the minimum projection magnification position of said projection magnification adjusting cam so that the inner edges of said right and left focusing plates are brought into agreements with the inner edges of the projection pictures irrespective of the projection magnification, and increases the interval of the focusing plates in the other rotating direction from the minimum projection magnification position so that the outer edges of said right and left focusing plates are brought into agreements with the outer edges of the projection pictures irrespective of the projection magnification.

7. A masking-amount guide device for a stereo slide according to claim 3, wherein a pair of straight line slide guides obliquely moving symmetrically to a centerline parallel to the optical axes of right and left projection lenses through the intermediate of right and left focusing plates, right projection lens holder is engaged with right slide guide and left projection lens holder is engaged with left slide guide, cam shafts are vertically installed at an intersection of extension lines of the right and left slide guides, said dial is provided at said cam shaft, two cams of the same shapes are attached to said cam shaft, and the phases of said two cams are displaced equally to the angle formed between the right and left slide guides, and a spring is disposed at said right and left projection lens holders to urge the right projection lens holder onto the right displacing cam and to urge the left projection lens holder onto the left displacing cam to constitute a projection magnification adjusting mechanism for synchronously moving the right and left projection lens holders by said cam.

8. A masking-amount guide device for a stereo slide according to claims 1, 2, 3, 6 or 7, wherein the projection magnification of the intermediate position between the minimum projection magnification position and the maximum projection magnification position of a projection magnification adjusting range is "1".

9. A masking-amount guide device for a stereo slide according to claim 2, 3 or 7, wherein right and left focusing plate interval adjusting mechanism is provided.

10. A masking-amount guide device for a stereo slide according to claim 4, wherein said focusing plate interval adjusting mechanism has an interval adjusting range from both + directions from the position where the pitch of the projection pictures coincide with the pitch of the focusing plates, and the pitch of the focusing plates is increased or decreased to the pitch of the projection pictures so that the masking amounts of the outside or inside of the projection pictures on the focusing plates is adjustable.

11. A masking-amount guide device for a stereo slide according to claim 5, wherein said lens interval adjusting mechanism has an interval adjusting range from both + directions from the position where the pitch of the projection pictures coincide with the pitch of the focusing plates, and the pitch of the focusing plates is increased or decreased to the pitch of the projection pictures so that the masking amounts of the outside or inside of the projection pictures on the focusing plates is adjustable.

12. A masking-amount guide device for a stereo slide according to claim 4, 5, 10 or 11, wherein the projection magnification is "1".

13. A masking-amount guide device for a stereo slide corresponding to a stereo camera having function of exposing a cutting position index at the edge of a film at the time of taking a photograph according to claim 1, 2, 3, 4, 5, 6, 7, 10, or 11, wherein a positioning index corresponding to the cutting position index of the film photographed by said stereo camera is provided at the film guide, the cutting position index is brought into agreement with the positioning index to bring the picture windows of the film guide into agreement with the picture of the film.

14. A masking-amount guide device for a stereo slide according to claim 1, 2, 3, 4, 5, 6, 7, 10, or 11, wherein focusing plates are formed replaceable, and replaced with focusing plates having no collimation patterns to be able to be used as a stereo slide viewer.

* * * * *

UNITED STATES PATENT AND TRADEMARK OFFICE
CERTIFICATE OF CORRECTION

PATENT NO.   : 5,879,064
DATED        : Mar. 9, 1999
INVENTOR(S)  : Minoru Inaba It is certified that error appears in the above-identified patent and that said Letters Patent is hereby corrected as shown below:

Column 7, line 32, "$\Delta if=f=\gamma$" should read --$\Delta if=fx\gamma$--

Signed and Sealed this

Twenty-first Day of September, 1999

Attest:

Q. TODD DICKINSON

*Attesting Officer*        Acting Commissioner of Patents and Trademarks